(12) United States Patent
Marshall et al.

(10) Patent No.: US 11,595,711 B2
(45) Date of Patent: Feb. 28, 2023

(54) PLATFORM-AGNOSTIC MEDIA FRAMEWORK

(71) Applicant: USTUDIO, INC., Austin, TX (US)

(72) Inventors: Joshua Marshall, Tokyo (JP); Timothy Jensen, Austin, TX (US); Thomas Stephens, Austin, TX (US)

(73) Assignee: USTUDIO, INC., Austin, TX (US)

( * ) Notice: Subject to any disclaimer, the term of this patent is extended or adjusted under 35 U.S.C. 154(b) by 0 days.

(21) Appl. No.: 16/772,257

(22) PCT Filed: Dec. 14, 2018

(86) PCT No.: PCT/US2018/065588
§ 371 (c)(1),
(2) Date: Jun. 12, 2020

(87) PCT Pub. No.: WO2019/118796
PCT Pub. Date: Jun. 20, 2019

(65) Prior Publication Data
US 2020/0404353 A1    Dec. 24, 2020

Related U.S. Application Data

(60) Provisional application No. 62/599,096, filed on Dec. 15, 2017.

(51) Int. Cl.
*H04N 21/258* (2011.01)
*G06F 16/955* (2019.01)
(Continued)

(52) U.S. Cl.
CPC ... *H04N 21/25816* (2013.01); *G06F 16/9566* (2019.01); *H04L 63/0815* (2013.01);
(Continued)

(58) Field of Classification Search
CPC ........ H04N 21/25833; H04N 21/25816; H04L 67/42; H04L 67/02; H04L 63/0815; G06F 16/9566; G06Q 10/10; G06Q 50/10
See application file for complete search history.

(56) References Cited

U.S. PATENT DOCUMENTS 8,671,274 B2 *   3/2014  Ross ................... H04L 63/0876
                                                        713/159
2008/0086689 A1  4/2008  Berkley et al.
(Continued)

OTHER PUBLICATIONS

International Search Report and Written Opinion dated Apr. 11, 2019, issued in related PCT/US2018/065588, 12 pages.
(Continued)

*Primary Examiner* — Chenea Davis
(74) *Attorney, Agent, or Firm* — Trop, Pruner & Hu, P.C.

(57) ABSTRACT

An embodiment includes software that causes a third node to perform operations comprising: in response to receiving a first identifier for a first node that includes at least one processor, authenticate a first user of the first node via a first authentication service; in response to receiving a second identifier for a second node that includes at least one processor, authenticate a second user of the second node via a second authentication service that is unequal to the first authentication service; in response to authenticating the first user of the first node, communicate a first list of media assets to the first computing node; in response to authenticating the second user of the second node, communicate a second list of media assets to the second computing node. Other embodiments are described herein.

17 Claims, 13 Drawing Sheets

(51) Int. Cl.
*H04L 9/40* (2022.01)
*H04L 67/02* (2022.01)
*H04L 67/01* (2022.01)

(52) U.S. Cl.
CPC .............. *H04L 67/01* (2022.05); *H04L 67/02* (2013.01); *H04N 21/25833* (2013.01)

(56) References Cited

U.S. PATENT DOCUMENTS

| | | | |
|---|---|---|---|
| 2010/0106848 A1* | 4/2010 | Van Hoff | G06F 3/0481 709/231 |
| 2012/0036494 A1* | 2/2012 | Gurumohan | G06Q 10/103 717/106 |
| 2014/0006930 A1 | 1/2014 | Hollis et al. | |
| 2014/0181935 A1 | 6/2014 | Beckmann et al. | |
| 2014/0196080 A1* | 7/2014 | Bugenhagen | G06Q 30/0277 725/32 |
| 2015/0334101 A1 | 11/2015 | Bruchner et al. | |
| 2016/0234201 A1* | 8/2016 | Sirota | G06Q 20/40 |
| 2017/0126827 A1 | 5/2017 | Stich et al. | |
| 2017/0295414 A1* | 10/2017 | Murray | H04N 21/4725 |
| 2018/0041814 A1* | 2/2018 | Christie | H04N 21/4622 |

OTHER PUBLICATIONS

Wikipedia, "Media player software", downloaded from https://en.wikipedia.org/wiki/Media_player_software, last edited Jan. 22, 2022.
Video.JS, "The open source HTML5 video player", downloaded from http://www2.videojs.com/ on Jan. 25, 2022.

* cited by examiner

```
{
  "config": {                                          501
    "auth": {
      "type": "SAML",
      "options": {
        "serviceUrl": "https://saml.login-service.com",
        "clientId": "CLIENT-ID",
        ...                                            502
      }
    },
    "data": {
      "type": "RSS",
      "options": {
        "serviceUrl": "https://rss.data-service.com",
        "version": 1.4,
        ...                                            503
      }
    },
    "player": {
      "type": "HTML5",
      "options": {
        "supportedFormats": ["HLS", "MP4", ...]
      }
    },                                                 504
    "analytics": {
      {
        "type": "HTTP",
        "params": {
          "serviceUrl": "https://web.stats-service.com"
        }
      }
    },                                                 505
    ...
  },
  "theme": {
    "colors": {
      "background_color": "#000000",
      "text_color": "#FFFFFF",
      ...                                              506
    },
    "images": {
      "LogoNavbar": "logo-navbar.png"
      ...
    },
    "files": [
      {
        "url": "https://cdn.com/logo-navbar.png",
        ...
      },
      ...
    ]
  }
}
```

Figure 5a

```
<rss version="2.0" xmlns:media="...">
<channel>                                                    507
    <title>A List of Media Content</title>
    <link>https://rss.service.com/feed.xml</link>
    <description>A list of private content.</description>
    <item>
        <title>First Episode</title>
        <link>http://site.com/ep1</link>
        <description>Episode description.</description>
        <guid isPermaLink="false">http://site.com/ep1</guid>
        <CCUID>ee37afda6918da91bc00a1de1046fae3</CCUID>   508
        <media:content url="http://cdn.com/ep1.m3u8"/>
        <media:thumbnail .../>
        <media:title>First Episode</media:title>
        <media:description>...</media:description>
    </item>
    <item>
        <title>Second Episode</title>
        <link>http://site.com/ep2</link>
        <description>Episode description.</description>
        <guid isPermaLink="false">http://site.com/ep2</guid>
        <CCUID>225a3af3ded343618a1a8c9a5adac944</CCUID>
        <media:content url="http://cdn.com/ep2.m3u8"/>
        <media:thumbnail .../>
        <media:title>Second Episode</media:title>
        <media:description>...</media:description>
    </item>
    ...
</channel>
```

Figure 5b

PLATFORM-AGNOSTIC MEDIA FRAMEWORK

CROSS-REFERENCE TO RELATED APPLICATION

This application claims priority to U.S. Provisional Patent Application No. 62/599,096 filed on Dec. 15, 2017 and entitled "Platform-Agnostic Media Framework", the content of which is hereby incorporated by reference.

TECHNICAL FIELD

Embodiments concern efficiency improvements to data processing and, more particularly, efficiency improvements to systems used to provide information through a network. Embodiments address, for example, improvements over web syndication such as Really Simple Syndication (RSS).

BACKGROUND

The advent of Web Syndication has created a powerful bond between content providers and content consumers. The current technology known as Real Simple Syndication (RSS) greatly simplifies this relationship and allows for a scalable application. The content providers organize published content into logical channels. All information regarding this channel such as content assets, publication dates, URL information, etc., is maintained by the content provider in a simple Extensible Markup Language (XML) document. When new content is published, this document is simply extended to include the new information and saved. The content consumers are aware of the presence of the document and instruct a user agent software to monitor the document for change. Upon detection of any change to the document, which indicates either a modification of existing content or the publication of new content, the user agent resolves these changes against the consumption history of the user. The agent then notifies the user of this update and the user may choose to consume the content at any time in the future. Web syndication allows for full decoupling of the publication vs. consumption activities and allows for the scale of one-to-many publisher to consumer relationships.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 5A and 5B shows an example of a consumption context unit in an embodiment.

DETAILED DESCRIPTION

Figure 1:
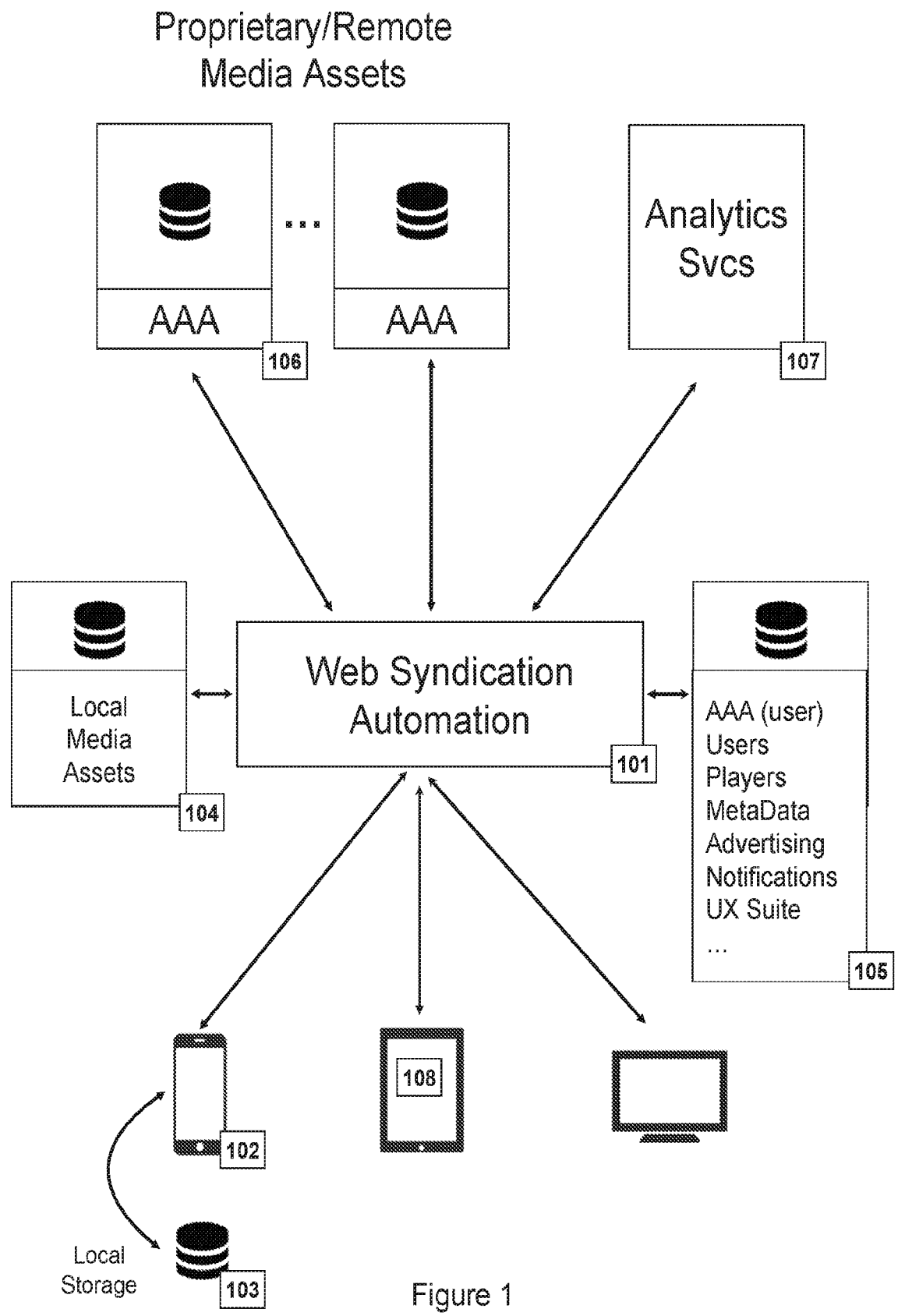
FIG. 1 concerns a network architecture in an embodiment.

Reference will now be made to the drawings wherein like structures may be provided with like suffix reference designations. In order to show the structures of various embodiments more clearly, the drawings included herein are diagrammatic representations of structures. Thus, the actual appearance of the structures, for example in a photo, may appear different while still incorporating the claimed structures of the illustrated embodiments. Moreover, the drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A and B" include situations with A, B, or A and B.

The "Background" section above addresses RSS. Applicant determined, however, RSS has several shortcomings and lacks several features and abilities that could enhance not only the publication and consumption processes but also provide significant additional commercial value to the a web syndication system. An embodiment described herein provides a framework for these extensions. Such an embodiment provides for a platform for aggregation, personalization, authentication, access control, accounting, and more, all of which are missing from the current web syndication art.

Applicant further noted current enterprise-oriented media consumption applications for mobile environments are designed to work with a specific service, tightly coupled with a restricted authentication workflow and authorization rules. Even those that claim to support Single Sign-On (SSO) still restrict the data model, authorization rules, access control, statistics and reporting, notification, playback options, and security features to specific platform requirements.

To address the above shortcomings, an embodiment consists of an application that resides between the content publishers and the content consumers. This middle-application is coupled to an extended feature user agent application to be used by the content consumer. The middle application works in concert and in direct communication with each user agent. This distribution of control logic allows for automation to be injected into the Web Syndication system. This automation extends the abilities of the content publishers and greatly enhances the user experience of the content consumers. This system conceptually replaces and greatly extends what is possible with the simple RSS XML document by creating and publishing services that may be utilized to abstract and virtualize all aspects of web syndication.

To further address the above shortcomings, an embodiment includes a platform-agnostic media application framework that allows playback of any media type (audio, video, live, VR, etc.) via an HTML5-powered player framework, inside any authentication system (whether it is SAML, OAuth, OpenID, or even custom/unique services), interfacing with any network backend (REST, RSS, RPC, etc. with any resource structure and access control rules), reporting to any analytics infrastructure (including media playback statistics, user tracking, and custom analytics tied to user roles and behavior), as well as supporting configurable push notifications, social functions like commenting and sharing, encrypted local resources, and other secure restrictive policies to ensure only authorized users are able to access content at any given moment.

Also, since the application can be configured from a remote service, the look-and-feel (branding, logos, colors, media player functionality, etc.) can be tailored to an individual organization's requirements dynamically without deploying new application builds.

FIG. 1 shows a detailed network diagram of an embodiment. Displayed within this drawing is a network of elements that may be connected via LAN or WAN interconnect such that an interactive communication system exists. Item 101 represents the web syndication automation layer residing within a web accessible server. In direct communication with 101 are three exemplary items (one of which is labeled 102) which represent mobile and/or WAN connected PC devices (e.g., phone, tablet, PC). The items, such as item 102, are the media consumption endpoints which are assumed to be under the control of human media consumers. Each item such as item 102 may be assumed to contain a local storage function (however only item 102 shows storage 103) which may be used by the user agent (agent 108 is shown with the tablet but other instances of the agent exists for the phone and the PC) for retention of applicable information such as authentication credentials, off-line copy of media, off line analytics collection, etc.) Directly attached to logic 101 is a locally stored library of media that may be consumed by device 102. These media assets (e.g., videos, audio files, etc.) are directly managed by the administrator(s) of logic 101. Also attached to logic 101 and directly administered are the contents of the operational database 105. Within 105 are all or most details needed for management of the user base (e.g., a group of sales personnel) and remote client environment (102, 103, 108) as well as all information needed for the proper authentication, delivery, and accounting for media that is published within the network (104, 106). All downloadable asset material required by 102 such as media player executables, branding, "look and feel" of the user experience, notifications, etc., is described as meta-data contained within 105.

Item(s) 106 represent media and authentication services that are remote to 101. 106 allows for remote and/or proprietary media to be seamlessly included into 101 as if it were locally stored in 104. An example of 106 would be an enterprise which wishes to publish private and/or proprietary media to a controlled user base along with more generally available media. The Authentication, Authorization, Accounting (AAA) services within 106 allow for the definition of consumer groups such that the enterprise could create department level media libraries for internal consumption as well as public, customer-facing libraries within the same system (101, 102).

In an embodiment, the AAA services of 106 may serve as the primary Authentication services for the entire 101 system. In this case, the users will experience a Single Sign On (SSO) experience where it appears they are signing into an enterprise application. It is also assumed in this case that the AAA services of 106 may be able to define user groups and classes of service that are then used to drive the construction of SC 408 and CCU 302 entities at any level of granularity.

Item(s) 107 represent the ability to describe remote analytics systems within 101 that are the receiver of statistics and events with each user's consumption context. 101 and 105 allow for an arbitrary set of analytics engines to be defined to be used in a configurable and flexible manner. An example of this would be to specify a different analytics engine for content within 106 as would be specified for content within 104.

Figure 2:
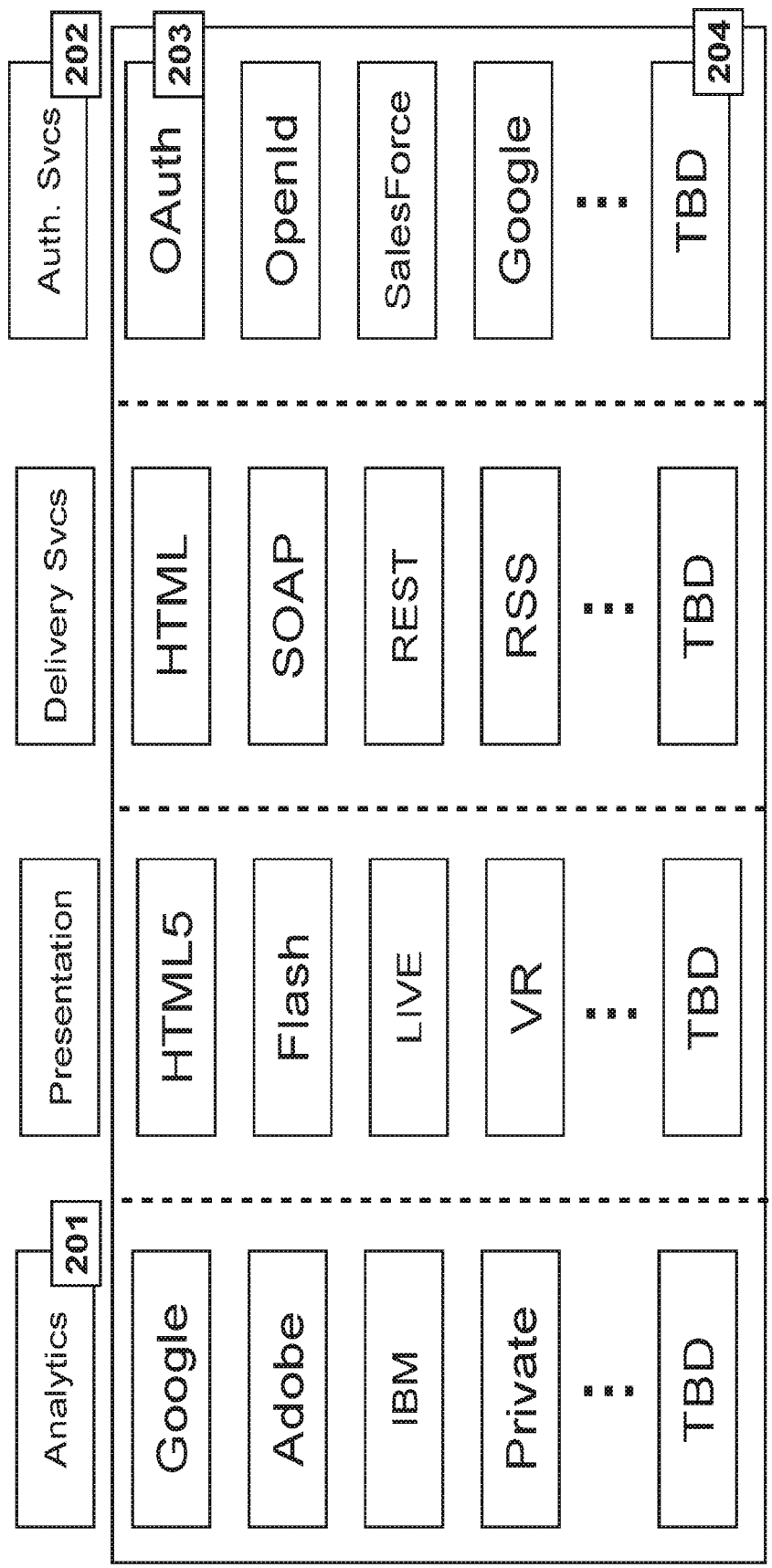
FIG. 2 concerns an architecture for enabling full automation at the media asset level.
Figure 3:
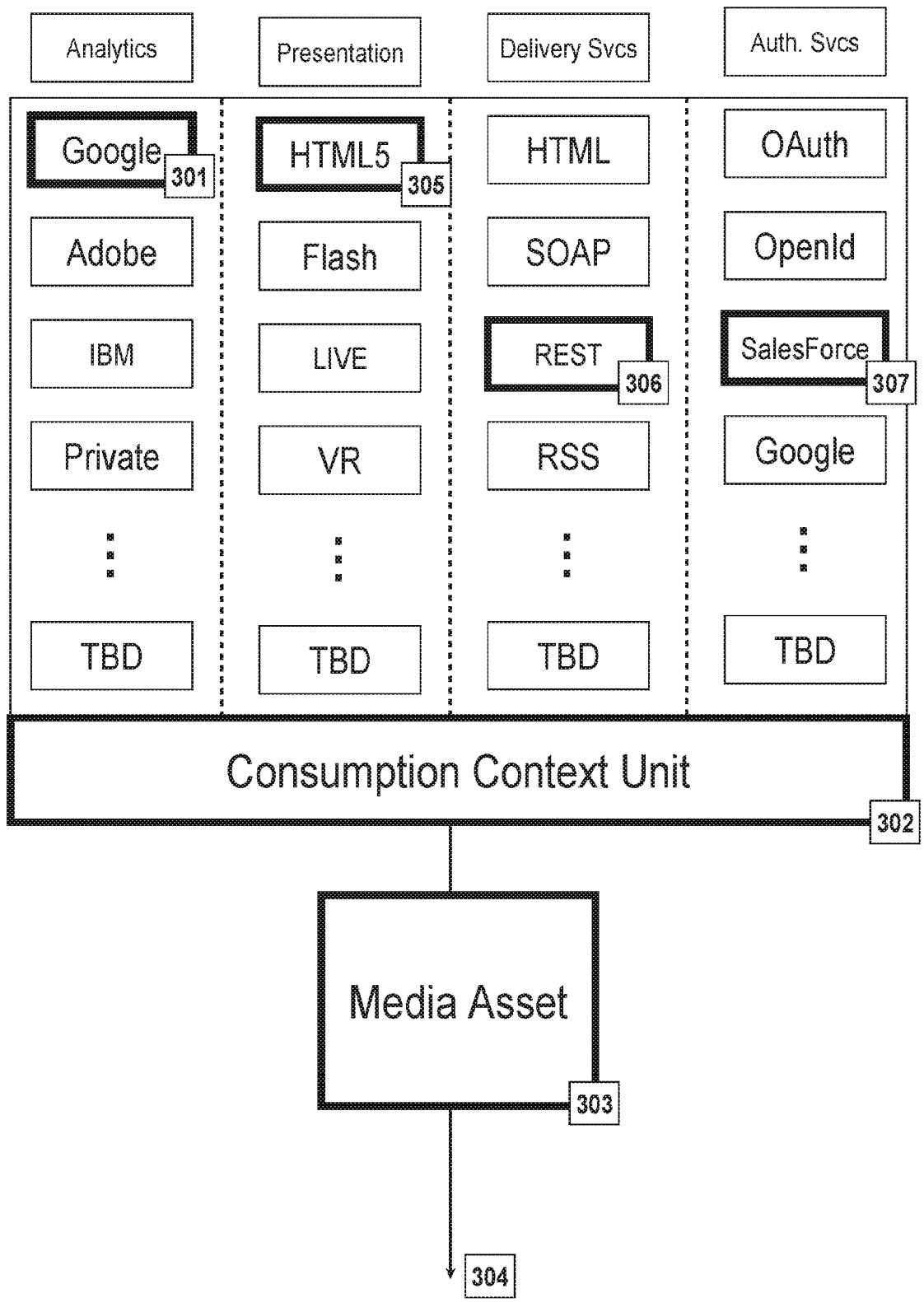
FIG. 3 addresses a process for utilizing the architecture of FIG. 2.

FIG. 2 represents a model for enabling full automation at the media asset level upon consumption. FIG. 2 shows a logical model for the collection of services within a specific service domain. 201 is a representation for one of these service domains. It is anticipated that the set of possible service domains is extensible in response to technology and commercial needs. As an example, 201 represents the Data Analytics service domain. Within 201 are individual service modules that provide proprietary and/or specific service within that domain. (e.g., Google Analytics as a target for 107.) The services (203, 204, etc.) described within may be individually selected to form an individual context for media consumption by asset. In other words, the system of FIG. 2 represents a menu where individual services are selected, as required, on an asset by asset basis. FIG. 3 describes this selection.

As shown in FIG. 3, the media asset 303 is determined to require the following individual services for consumption: Google Analytics (301), an HTML5 Video player (305), asset delivery via a Web-based REST interface (306), the REST interface is authenticated by the SalesForce.com SSO interface/credentials (307). Each of the individual service selections combine to form a logical unit named a Consumption Context Unit (CCU) 302. 302 defines all variable and configurable aspects for service delivery encompassing the full consumption live cycle of media asset 304.

The details and associations for the construction of 302 are contained within 105 and may be considered to be a dynamic collection, able to be defined at initial media publication but altered at any time thereafter.

FIGS. 5A and 5B show an example configuration of the CCU as a JSON representation and an example RSS file that could be retrieved as part of the process. The initial JSON file may be stored with the application or retrieved from a network service dynamically based on device settings, user input, or other contextual information. 501 details the JSON configuration. 502 details an example authentication configuration for a SAML endpoint. 503 details an example data configuration, providing access rules that inform the client how to retrieve and parse the resulting RSS metadata for shows, media assets, etc. 504 displays an example HTML5 player configuration, including listing the supported media types to request from the data layer. 505 displays an example analytics configuration using an HTTP service URL. 506 demonstrates various example theming controls including color values, image references, and file locations in order to retrieve and store branding assets in local storage. Other service configurations may be provided for social interactions or other purposes. These configurations may dynamically change based on responses from the authentication layer, the data layer, etc. 507 demonstrates an example RSS document that could be retrieved for a single show. 508 shows that a data layer may reference the CCU identifier indexing the union of configurations that were used to access the content.

Figure 4:
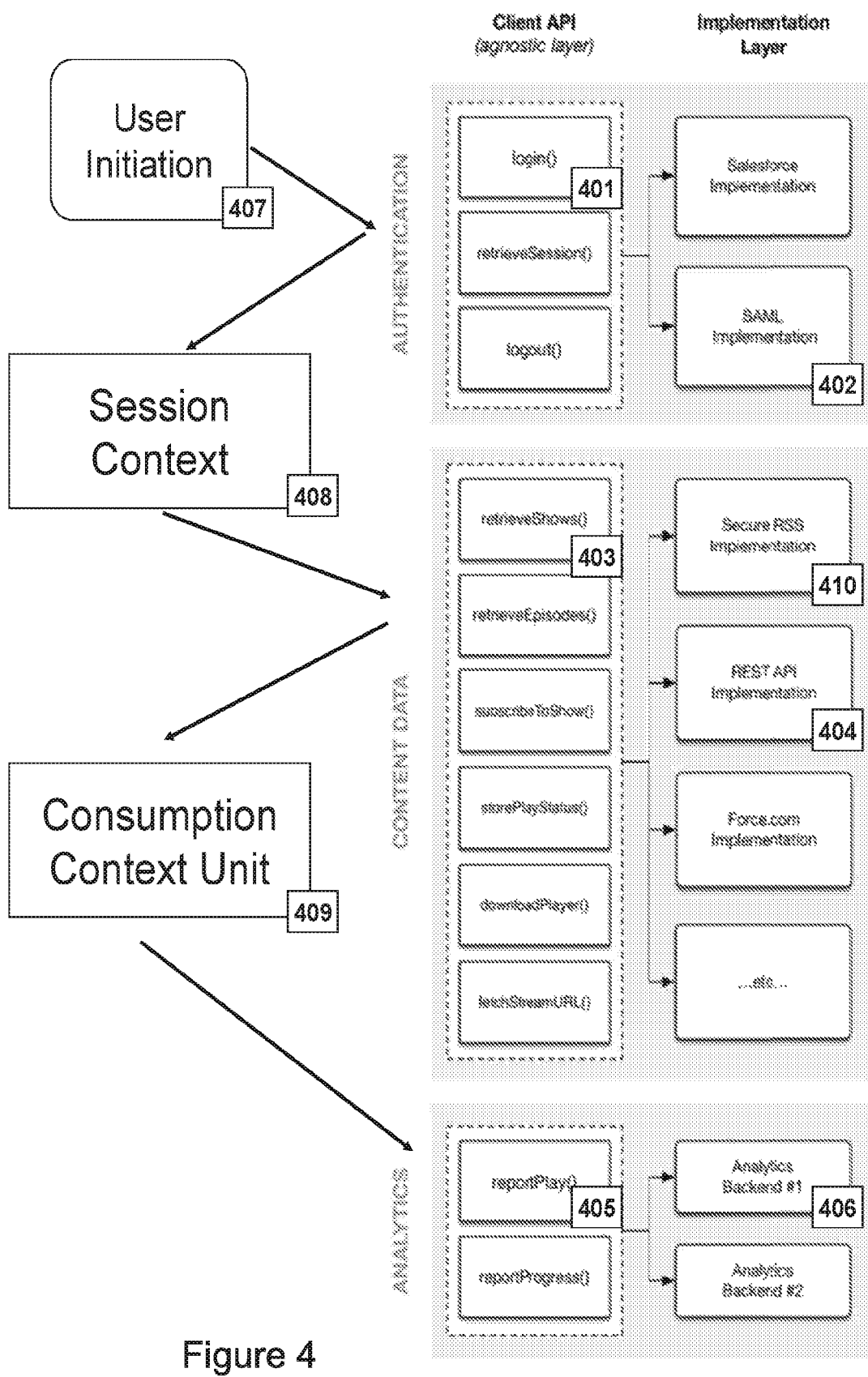
FIG. 4 concerns an application program interface (API) and use thereof in an embodiment.

FIG. 4 displays an embodiment as it applies to a client-facing Application Program Interface (API). The definition of this API provides a level of abstraction for the client application (108) such that variable implementations may be implemented via a unified data interface, such that any authentication backend, content storage service, analytics collector, etc., may be used while providing the same client experience.

For example, the client as installed provides a minimal UI such that the initial user flow is as simple as initiating the login process 407. The UI elements translate into 108 making a service call to the top-level login( ) method 401. This 401 action would call into the specific module that is configured for the application either as contained in 105 and/or 106 or and is configured locally in 108. Once identified, the API call resolves to the specific service executable that is required. For an example SAML implementation 402, a web interface would be launched inside the client application 108, and the resulting callback would return a SessionContext (SC) record 408 which would later be provided to retrieveSession( ), logout( ), retrieveShows( ) etc., calls as needed.

The retrieveShows( ) 403 method, which when provided a valid 408 record, would retrieve a supported list of media content for which the current user is authorized to view. Each of these content instances would be accompanied by its specific CCU 302 record as constructed using the SC 408 as an index.

For instance, based upon the SC 408 associated to an individual user, a user group may be created and enforced. Upon the 401 call, if the SAML endpoint 402 reported that the user was a member of the Marketing organization, the list of shows 303 and CCUs 409 would be different from that of a user in the Sales organization.

Subsequently, a REST implementation 404 would need to convert the SessionContext 408 into the appropriate HTTP requests and standardize the response into a List<Show> response object, as well as an updated SessionContext 408 as necessary. This is repeated for any other implementations (for instance, if the RSS implementation 410 were specified in the CCU 409, 410 would fetch the RSS document and convert the response XML into a similar List<Show> object), and the pattern is followed for analytics (405, 406), social actions 608, etc.

Figure 6A:
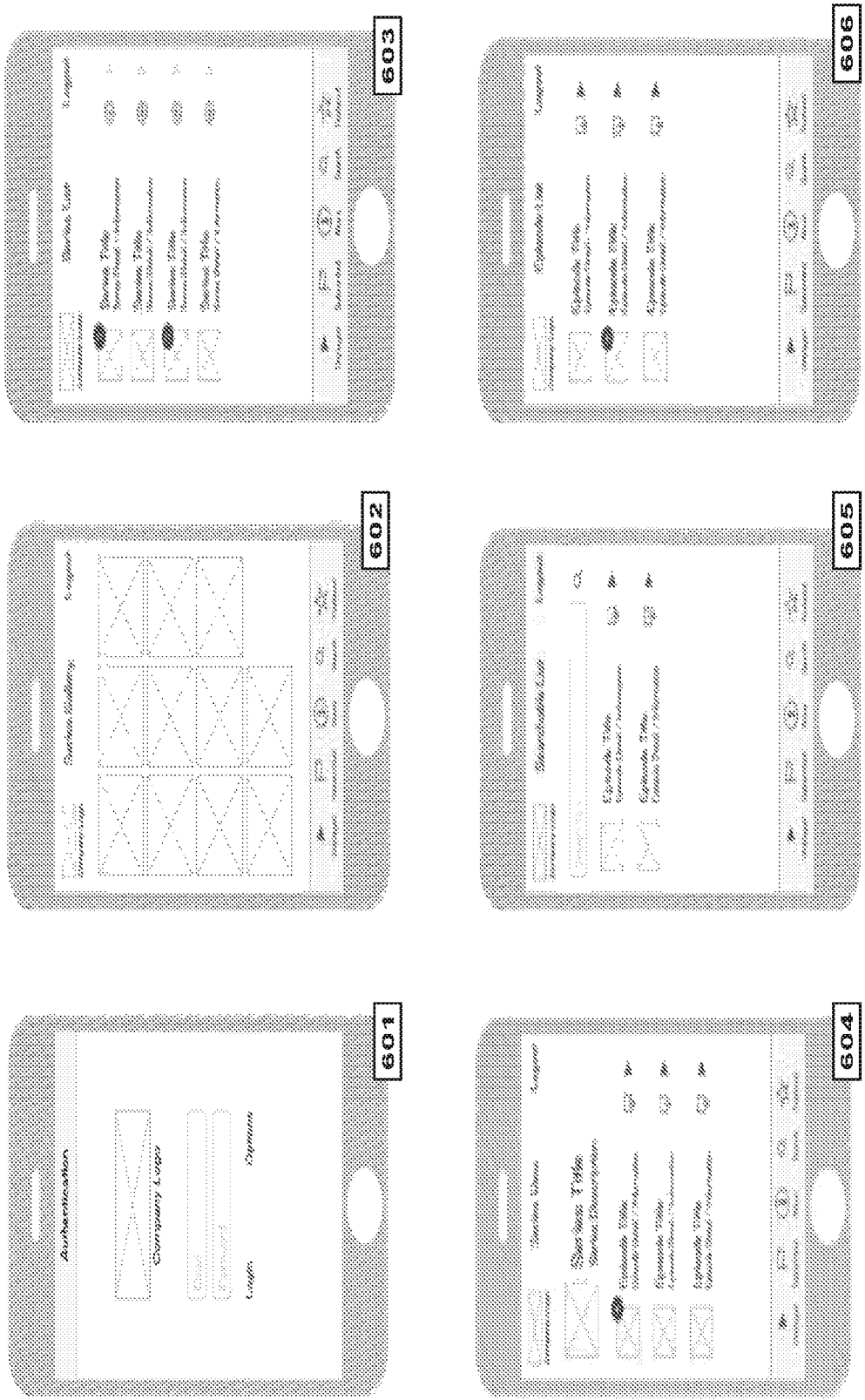
FIGS. 6A and 6B show a process from a client perspective in an embodiment.
Figure 6B:
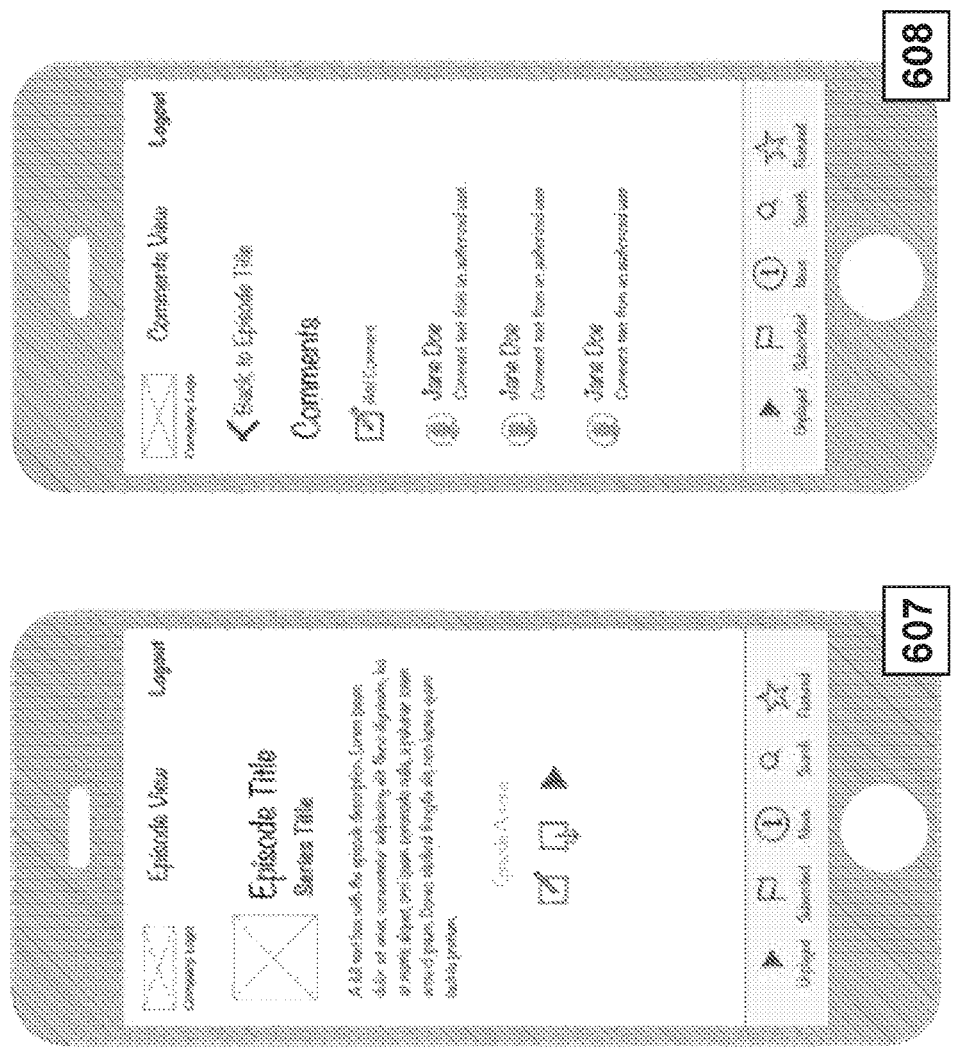

FIGS. 6A and 6B display an exemplary view of the user experience when combined with the system of logical automation described above. Image 601 shows the initial state of the client 108 at the initial user initiation state 407. Steps 401, 402, 408, 403, 404 show an example flow within this embodiment that results in a list of consumable assets in the form of a set of CCU records 409. 108 then parses and displays 409 in a user readable list of series 602, 603, and episodes within the series 604, 605, 606. The final use of the CCU 302 is shown in image 607 where the user is presented with the Play button to initiate the transfer of the asset 303 from either local storage or remote access to be rendered for display. Aspects of this workflow are defined by the CCU system of FIG. 3 and automated through the workflow system of FIG. 4.

Figure 7:
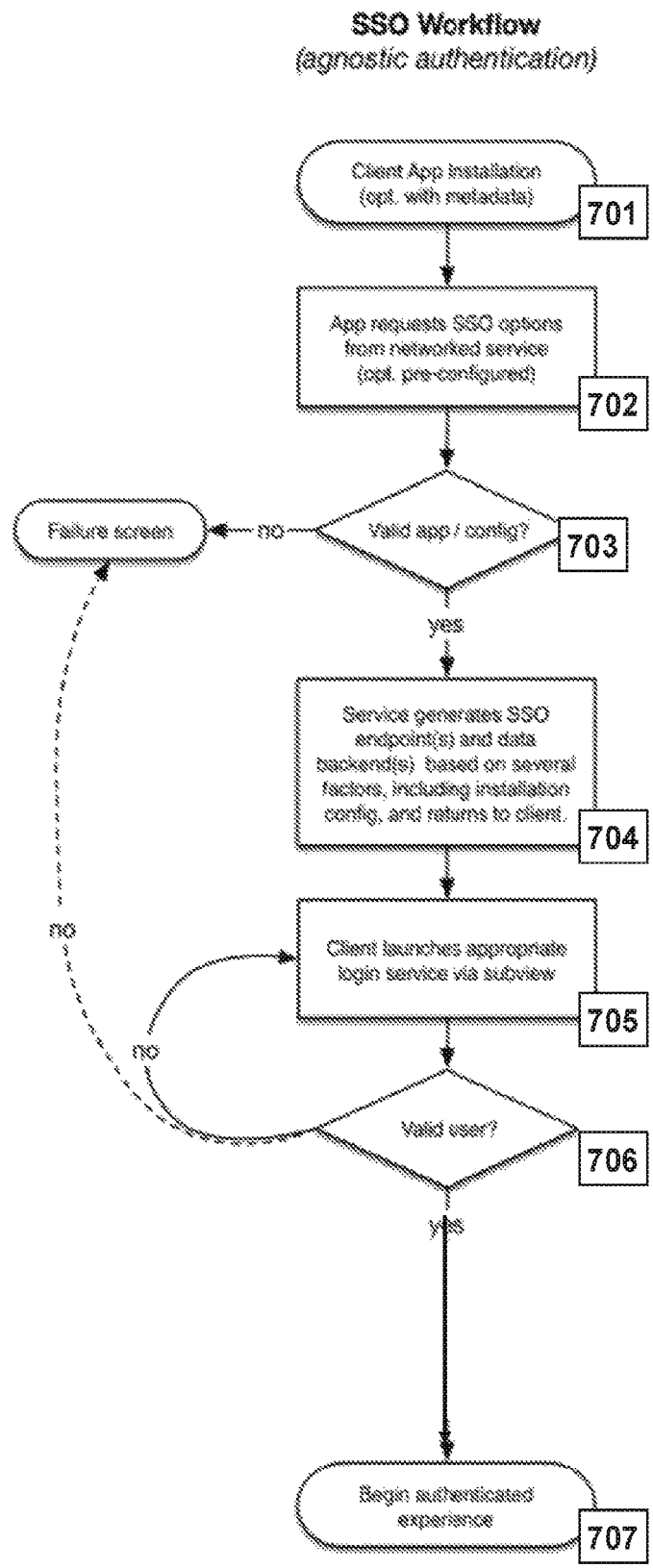
FIG. 7 shows an authentication method in an embodiment.
Figure 8:
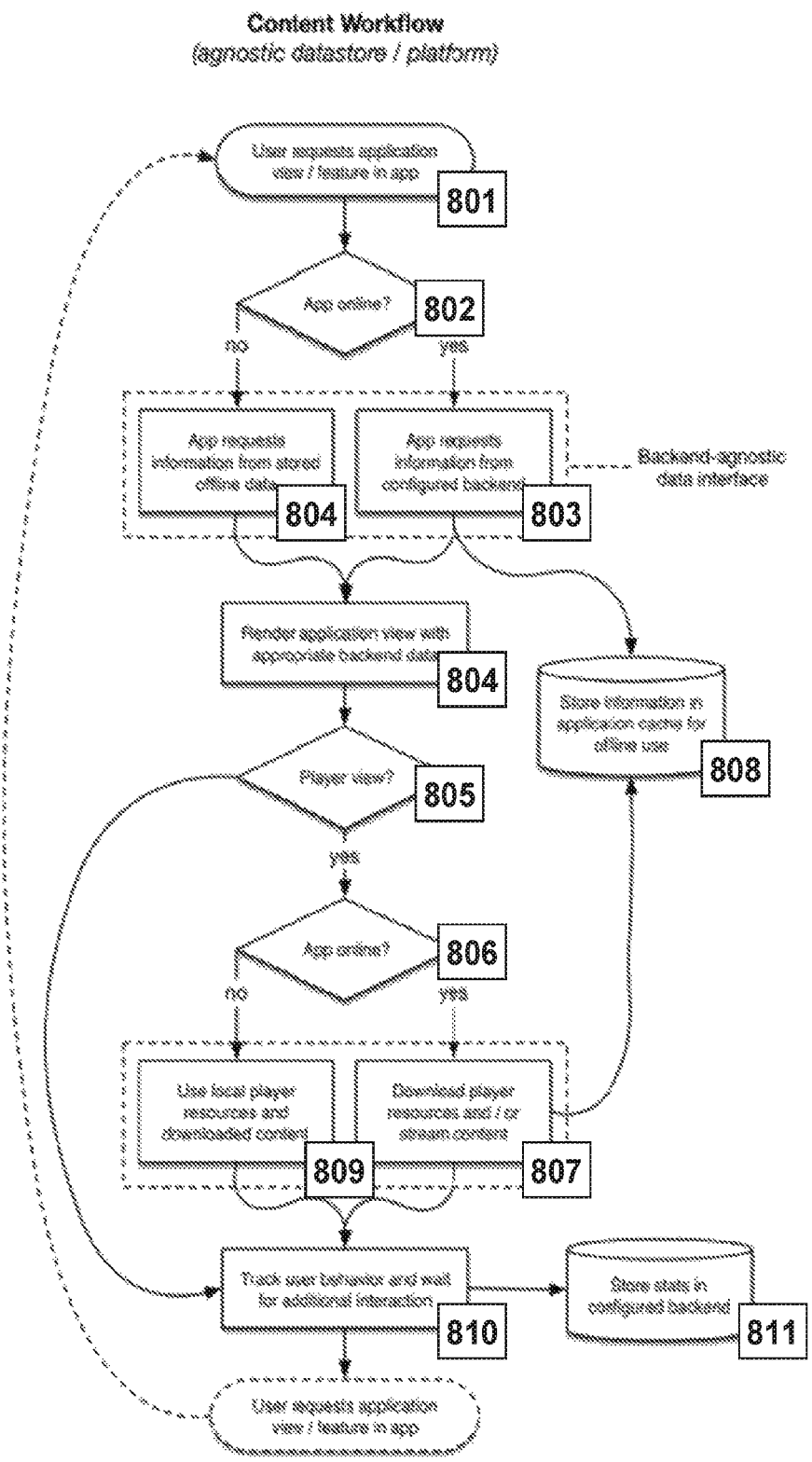
FIG. 8 shows a content provision method in an embodiment.

A more detailed flow of embodiments concerning the above steps are shown in FIGS. 7 and 8.

In FIG. 7, the user experience begins with step 701 where the client application 108 is requested to be installed upon the user mobile or desktop device. This initial installation may also include a set of configurations that is delivered along with the application itself. This metadata could be used to set certain configuration parameters in order to either narrow the options for a specific user or to reduce the number of user actions required to authenticate (e.g., indicating a specific endpoint for an SSO provider, or even providing an initial token or key if the user is logged into an external system that redirects to the application installation). This installation step may resemble conventional application installation (e.g., iTunes, Google Android App Store).

Once the application 108 is initialized and the user requests to log-in (407), step 702 commences. 108 will utilize the API as described in FIG. 4 proceeding with the general login request 401. The recipient of this request will be the application 101. 101 will then consult the operational database 105 to determine the authentication/SSO options that have been administered for that individual user and/or user agent, step 703.

Using the pre-packaged Metadata as described above, this system provides for the creation of enterprise-specific and/or group-specific packages that are pre-configured to allow access only to specific media libraries. As 101 consults 105, given the usage of metadata and/or other agent specific information, a partial CCU 302 is built and returned to the user agent 108 in step 704. This partial CCU is constructed dynamically based upon information that is keyed by the user identity of the consumer, metadata, etc., and therefore, it will contain possibly different information for different users and/or at different times of execution.

In step 705, 108 parses the CCU record upon receipt and launches the specified Authentication service as needed. Note that if multiple SSO options are available in the CCU 302, they will likely be presented in a list and the user may need to select one. Once the user initiates a login process, the specific actions against that service will result in success or failure shown in step 706. An important aspect of this embodiment is that the CCU 302 may specify 101 as the authentication endpoint or it may specify one or more from the set or remote services 106. The media consumer is not aware of this aspect of operation and simply "sees" a single authentication window 601, regardless of the actual location of that service.

Upon a successful authentication, the authentication service must return a session context 408 which may be used against any of the content backends in the future workflow steps as shown in 707 with the flow described in FIG. 8 commencing immediately.

Note that this embodiment provides for media to be consumed in an offline mode (e.g., 108 is not connected to the mobile/WAN network.) There are therefore, these two paths for media consumption described in FIG. 8. This test is performed in step 802.

If 102 is determined to be in online mode step 803 commences with additional detail in shown in the 408, 403, 404 sequence. It is in this sequence that the full CCU record is built where a list is built containing each media asset that is accessible to that specific user. Each media asset is represented by a CCU 302 instance which specifies all details for all services needed to consume that asset on the specified device by the authenticated user. This full CCU 302 and asset 303 information is then parsed and rendered in the UI of 108 as described in screens 602 through 606 sequentially and in 804 as a summary. The above steps serve to fetch the dynamic list of accessible media along with all aspects of media consumption, and render that result to the user.

The user may then make a selection of a specific media asset to view 607, and initiates the play sequence. Step 805 makes a determination whether the selected media requires a player executable to be launched (e.g., an audio media asset may not require a special player environment). The received CCU 302 instance is consulted and assuming that a player is required and also that 108 is in online mode (806), step 807 commences.

In step 807, the CCU 302 instance for that specific media asset is again consulted and all services and/or parameters for consumption of that media asset are prepared and the transfer and presentation of the media itself is initiated. Step 808 shows how all information products of step 807 are stored locally into 103 for that client such that the offline path in FIG. 8 may be executed in the future.

The details of the offline path may be simplified as a small variation of the workflow as described above. If it is determined that the client is offline in 802, step 804 is executed where the CCU 302 instances previously received via 807 and stored via 808, are accessed from local storage 103. Similarly, if the client is offline, the player executable that was fetched via 807 and stored via 808 is accessed from local storage 103. All other aspects of media consumption described in FIG. 8 proceed identically from this point.

Regardless of offline/online mode, consumption analytics are tracked during playback 810. The CCU 302 is consulted as to where to report these statistics (e.g., a selection from 201) and the client posts all events to a remote online service 811.

Upon termination of the consumption activity, the user is returned to state 801.

Image 608 shows an exemplary extension to systems described above. In this embodiment, the CCU system (see FIG. 3) and workflow and API system (see FIG. 4) have been extended to include social media interaction. In other words a new service domain (e.g., logically similar to 201 or 202) is identified and a new logical column may be added to FIG. 2. Within this new service domain, all applicable service endpoints (e.g., logically similar to 203 or 204) are defined and implemented. These are optional service selections that may be specified for that service domain when the CCU is dynamically constructed. Once completed, any CCU instance 302 may also then contain directives that associate a user/client/media tuple to the desired new set of functional service behaviors. This social media extension example would allow for user comments, reposting etc., to be strictly controlled by policy and AAA systems through the use of this embodiment as one in the art can foresee. All of these actions are surfaced in the CCU 302 constructed for that consumption event.

Figure 9:
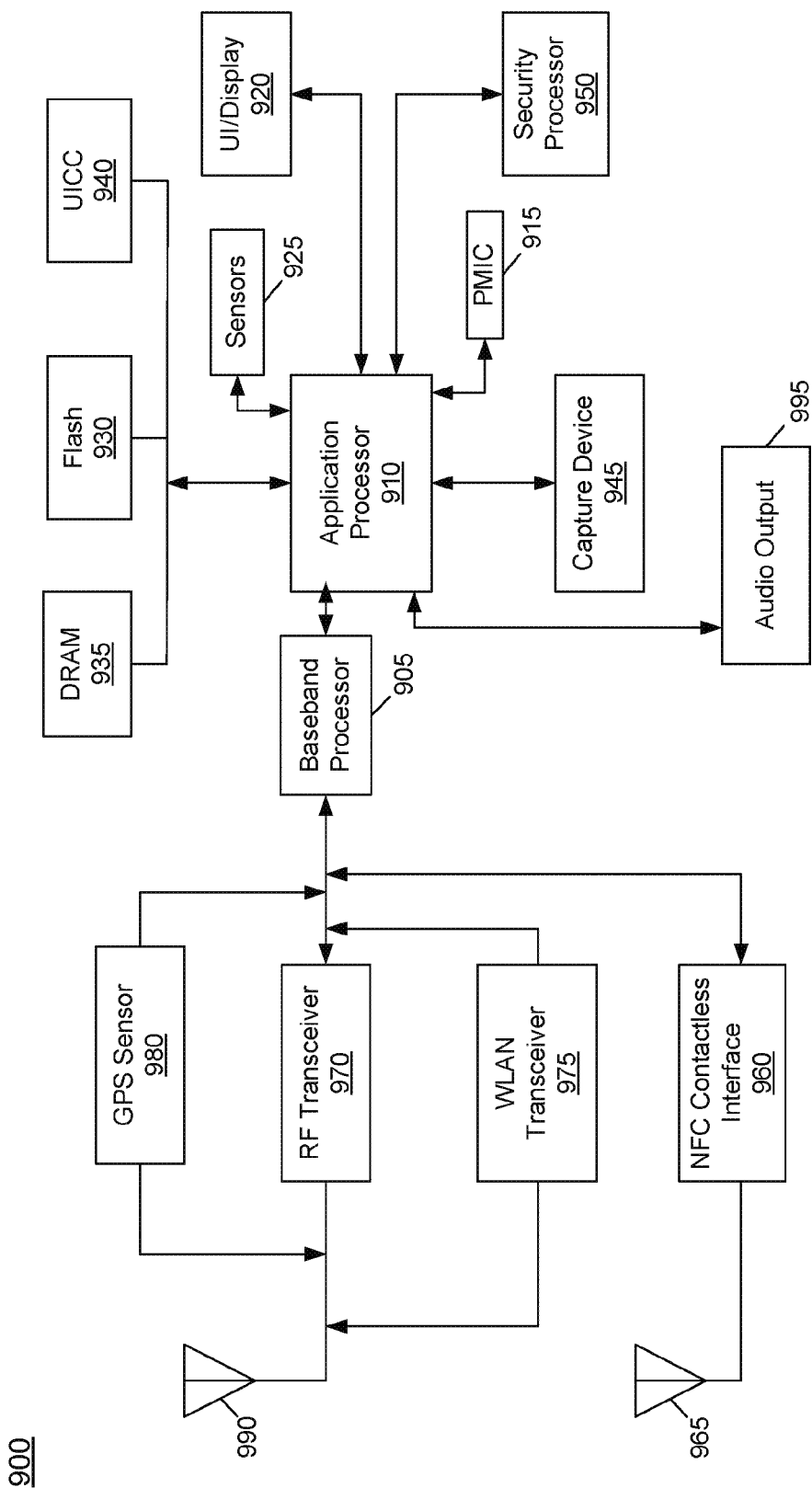
FIGS. 9, 10, 11 include systems for enabling embodiments.
Figure 10:
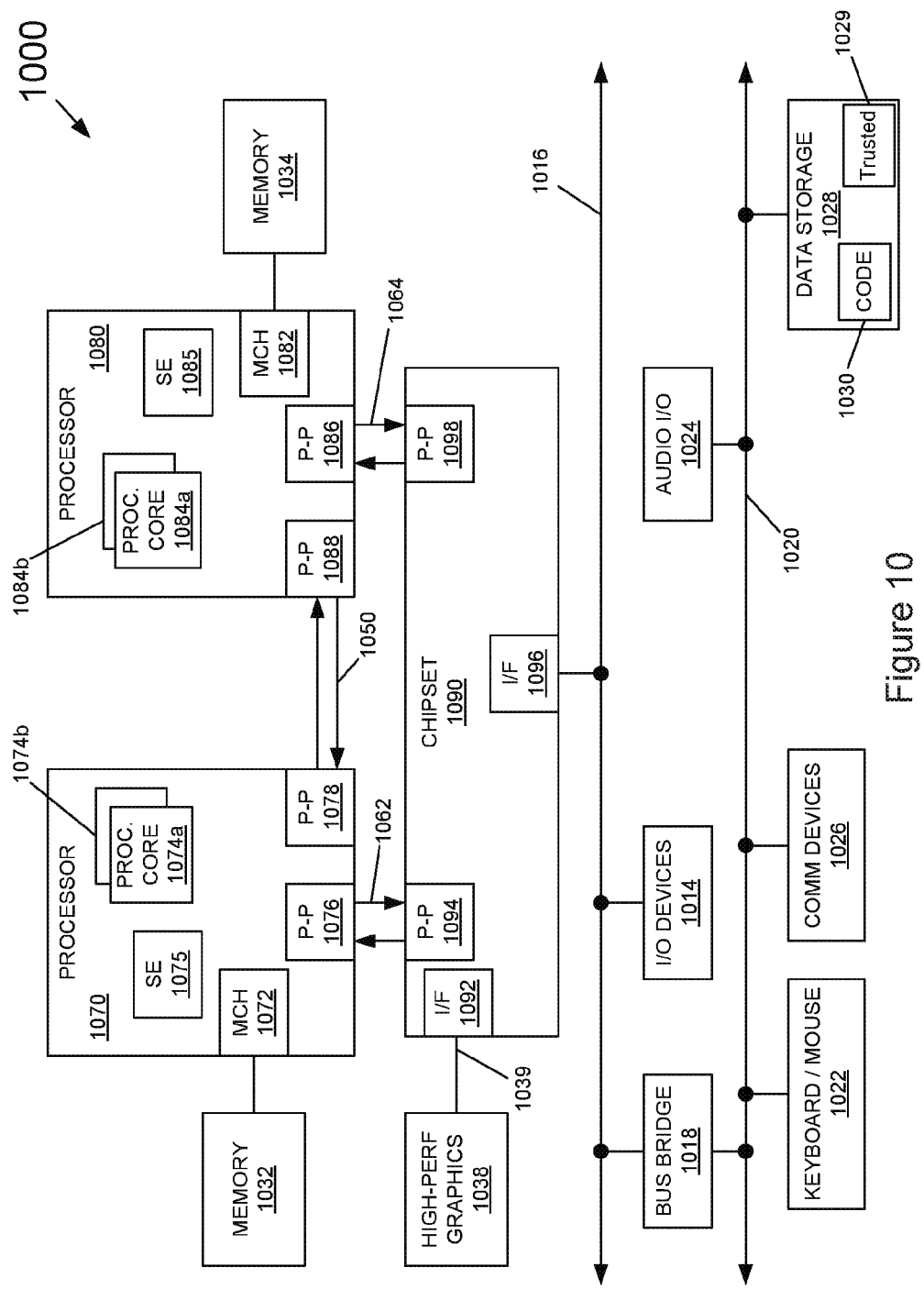
Figure 11:
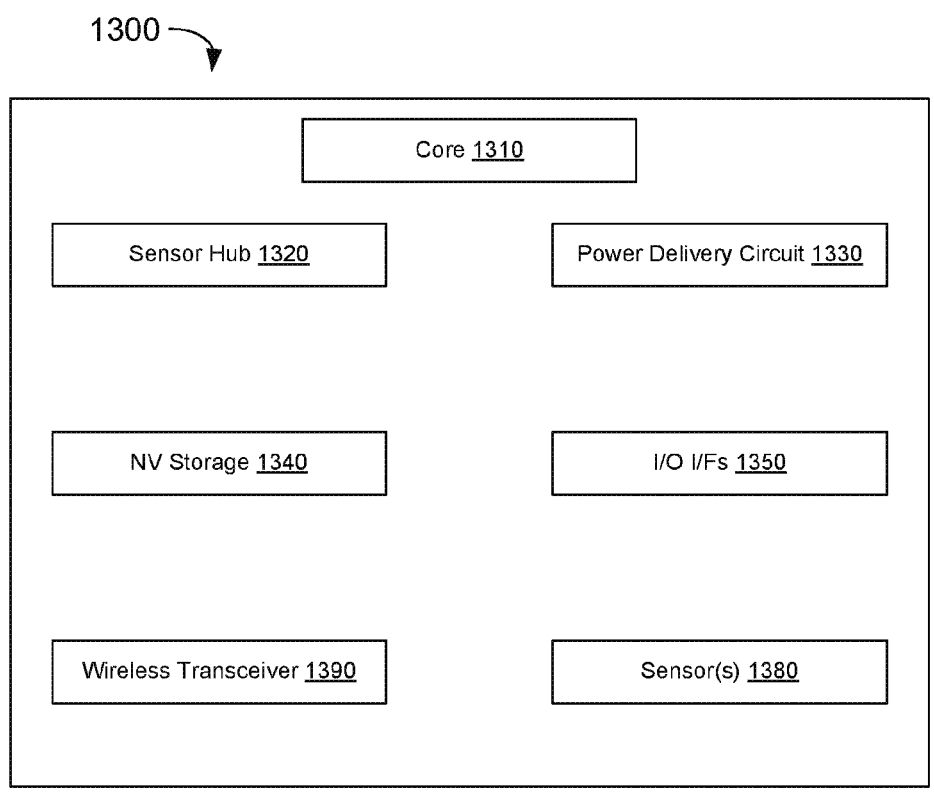

FIGS. 9-11 includes systems upon which embodiments may be executed.

Referring now to FIG. 9, shown is a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935. As further seen, application processor 910 also couples to audio output 995 and a capture device 945 such as one or more image capture devices that can record video and/or still images.

A universal integrated circuit card (UICC) 940 comprises a subscriber identity module, which in some embodiments includes a secure storage to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices may be used to receive, for example, user biometric input for use in authentication operations.

As further illustrated, a near field communication (NFC) contactless interface 960 is provided that communicates in a NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more internet of things (IoT) networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Referring now to FIG. 10, shown is a block diagram of a system in accordance with another embodiment. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1062 and 1064, respectively. Chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Referring now to FIG. 11, embodiments may be used in environments where IoT devices may include wearable devices or other small form factor IoT devices. Shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a Trusted Execution Environment (TEE). Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (TO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

The following examples pertain to further embodiments.

Example 1: At least one machine-readable medium having stored thereon data which, if used by a third node that includes at least one processor, causes the third node to perform operations comprising: in response to receiving a first identifier for a first node that includes at least one processor, authenticate a first user of the first node via a first authentication service; in response to receiving a second identifier for a second node that includes at least one processor, authenticate a second user of the second node via a second authentication service that is unequal to the first authentication service; in response to authenticating the first user of the first node, communicate a first list of media assets to the first computing node; in response to authenticating the second user of the second node, communicate a second list of media assets to the second computing node; wherein the first list of media assets includes a first number of media assets, the second list of media assets includes a second number of media assets, and the first number is unequal to the second number.

The identifier may include a field from the first screen of FIG. 6A. The first node may include a phone and the third node may include a server, computing cluster, and the like. The users may be from different organizations (e.g., different companies that both employ an additional company that manages the third node) or different groups within an organization (e.g., sales vs. marketing groups). Thus, the users may obtain differing aggregations of media assets (e.g., videos).

Example 2. The at least one medium of example 1: wherein receiving the first identifier for the first node includes receiving the first identifier for the first node at a first time; wherein the operations further comprise in response to receiving the first identifier for the first node at a second time that follows the first time, authenticate the first user of the first node via at least one of the second authentication service or a third authentication service.

Thus, a user may revisit the third node many times over one or more years. However, the user's company may have switched authentication services during that time. Still, the user may be oblivious to such a switch as the switch is handled in the background by, for example, a CCU.

Example 3. The at least one medium of example 1, wherein the operations comprise: in response to authenticating the first user, communicating a first media player to the first computing node; in response to authenticating the second user, communicating a second media player to the second computing node but not the first computing node; wherein the first media player corresponds to a first format of media and the second player corresponds to a second format of media; wherein the first format of media is unequal to the second format of media.

Example 4. The at least one medium of example 3, wherein the first media player includes an executable file.

Example 5. The at least one medium of example 1, wherein the operations comprise: in response to authenticating the first user, communicating at least one first configuration file to the first computing node; in response to authenticating the second user, communicating at least one second configuration file to the second computing node but not the first computing node.

Such files may include, for example, JSON CCU files.

Example 6. The at least one medium of example 5, wherein: the at least one first configuration file directs the first user to a first analytics service; the at least one first configuration file directs the second user to a second analytics service.

Example 7. The at least one medium of example 6, wherein the operations comprise: in response to authenticating the first user, creating at least a portion of the first configuration file; in response to authenticating the second user, creating at least a portion of the second configuration file.

For example, portions of a CCU may be formed "on the fly."

Example 8. The at least one medium of example 7, wherein the first and second authentications services are hosted on different computing nodes from one another.

For instance, the services may be hosted by different companies that operate services on different server systems.

Example 9. The at least one medium of example 5: wherein receiving the first identifier for the first node includes receiving the first identifier for the first node at a first time; wherein the operations further comprise in response to receiving the first identifier for the first node at a second time that follows the first time, communicate a third list of media assets to the first computing node; wherein the third list of media assets includes a third number of media assets, and the first number is unequal to the third number.

For instance, the user's aggregated videos may change over time.

Example 10. The at least one medium of example 9, wherein the operations comprise: determining a characteristic of the first node; in response to determining the characteristic of the first node, communicating the at least one first configuration file to the first computing node.

Example 11. The at least one medium of example 10, wherein the characteristic of the first node corresponds to a characteristic of hardware included in the first node.

For instance, a portion (e.g., 1%, 50%, 100%) of a CCU may be formed after determining a type of phone a user is operating.

Example 12. The at least one medium of example 9, wherein the operations comprise: determining a characteristic of the first node; in response to determining the characteristic of the first node, creating a portion of the at least one first configuration file and then communicating the portion to the first node.

Example 13. The at least one medium of example 5, wherein the at least one first configuration file includes configuration information for the first authentication service but not the second authentication service.

Example 14. The at least one medium of example 6, wherein the at least one first configuration file includes configuration information for the first analytics service.

Example 15. The at least one medium of example 14, wherein the at least one first configuration file includes branding information corresponding to a single sign on (SSO) display.

For instance, see the first screen of FIG. 6A.

Example 16. The at least one medium of example 15, wherein the at least one first configuration file includes configuration information for a media player.

Example 17. The at least one medium of example 5, wherein the at least one first configuration file includes a Real Simple Syndication (RSS) document.

Example 18. The at least one medium of example 5: wherein the at least one first configuration file includes an identifier corresponding to a group; in response to receiving a fourth identifier for a fourth node that includes at least one processor, determine the fourth identifier is included within a group that includes the first identifier; in response to determine the fourth identifier is included within the group, communicating another instance of the at least one first configuration file to the fourth computing node.

Example 19. The at least one medium of example 5, wherein the operations comprise in response to authenticating the first user, communicating at least one third configuration file to the first computing node; wherein the at least one first configuration file corresponds to a first media asset included in the first list; wherein the at least one third configuration file corresponds to a third media asset included in the first list.

For instance, a company may have a standard CCU for a group of employees.

Example 1a: An apparatus comprising: a third node including at least one memory and at least one processor, coupled to the at least one memory, to perform operations comprising: in response to receiving a first identifier for a first node that includes at least one processor, authenticate a first user of the first node via a first authentication service; in response to receiving a second identifier for a second node that includes at least one processor, authenticate a second user of the second node via a second authentication service that is unequal to the first authentication service; in response to authenticating the first user of the first node, communicate a first list of media assets to the first computing node; in response to authenticating the second user of the second node, communicate a second list of media assets to the second computing node; wherein the first list of media assets includes a first number of media assets, the second list of media assets includes a second number of media assets, and the first number is unequal to the second number.

Example 2a. The apparatus of example 1a: wherein receiving the first identifier for the first node includes receiving the first identifier for the first node at a first time; wherein the operations further comprise in response to receiving the first identifier for the first node at a second time that follows the first time, authenticate the first user of the first node via at least one of the second authentication service or a third authentication service.

Example 3a. The apparatus of example 1a, wherein the operations comprise: in response to authenticating the first user, communicating a first media player to the first computing node; in response to authenticating the second user, communicating a second media player to the second computing node but not the first computing node; wherein the first media player corresponds to a first format of media and the second player corresponds to a second format of media; wherein the first format of media is unequal to the second format of media.

Example 4a. The at least one medium of example 3a, wherein the first media player includes an executable file.

Example 5a. The apparatus of example 1a, wherein the operations comprise: in response to authenticating the first user, communicating at least one first configuration file to the first computing node; in response to authenticating the second user, communicating at least one second configuration file to the second computing node but not the first computing node.

Example 6a. The apparatus of example 5a, wherein: the at least one first configuration file directs the first user to a first analytics service; the at least one first configuration file directs the second user to a second analytics service.

Example 7a. The apparatus of example 6a, wherein the operations comprise: in response to authenticating the first user, creating at least a portion of the first configuration file; in response to authenticating the second user, creating at least a portion of the second configuration file.

Example 8a. The apparatus of example 7a, wherein the first and second authentications services are hosted on different computing nodes from one another.

Example 9a. The apparatus of example 5a: wherein receiving the first identifier for the first node includes receiving the first identifier for the first node at a first time; wherein the operations further comprise in response to receiving the first identifier for the first node at a second time that follows the first time, communicate a third list of media assets to the first computing node; wherein the third list of media assets includes a third number of media assets, and the first number is unequal to the third number.

Example 10a. The apparatus of example 9a, wherein the operations comprise: determining a characteristic of the first node; in response to determining the characteristic of the first node, communicating the at least one first configuration file to the first computing node.

Example 11a. The apparatus of example 10a, wherein the characteristic of the first node corresponds to a characteristic of hardware included in the first node.

Example 12a. The apparatus of example 9a, wherein the operations comprise: determining a characteristic of the first node; in response to determining the characteristic of the first node, creating a portion of the at least one first configuration file and then communicating the portion to the first node.

Example 13a. The apparatus of example 5a, wherein the at least one first configuration file includes configuration information for the first authentication service but not the second authentication service.

Example 14a. The apparatus of example 6a, wherein the at least one first configuration file includes configuration information for the first analytics service.

Example 15a. The apparatus of example 14a, wherein the at least one first configuration file includes branding information corresponding to a single sign on (SSO) display.

Example 16a. The apparatus of example 15a, wherein the at least one first configuration file includes configuration information for a media player.

Example 17a. The apparatus of example 5a, wherein the at least one first configuration file includes a Real Simple Syndication (RSS) document.

Example 18a. The apparatus of example 5a: wherein the at least one first configuration file includes an identifier corresponding to a group; in response to receiving a fourth identifier for a fourth node that includes at least one processor, determine the fourth identifier is included within a group that includes the first identifier; in response to determine the fourth identifier is included within the group, communicating another instance of the at least one first configuration file to the fourth computing node.

Example 19a. The apparatus of example 5a, wherein the operations comprise in response to authenticating the first user, communicating at least one third configuration file to the first computing node; wherein the at least one first configuration file corresponds to a first media asset included in the first list; wherein the at least one third configuration file corresponds to a third media asset included in the first list.

Example 1b: At least one machine-readable medium having stored thereon data which, if used by first and second nodes that each include at least one processor, causes the first and second nodes to perform operations comprising: the first node communicating a first identifier to a third node that includes at least one processor and that authenticates a first user of the first node via a first authentication service; the second node communicating a second identifier to the third node that authenticates a second user of the second node via a second authentication service that is unequal to the first authentication service; in response to authenticating the first user of the first node, the first node receiving a first list of media assets from the third computing node; in response to authenticating the second user of the second node, the second node receiving a second list of media assets; wherein the first list of media assets includes a first number of media assets, the second list of media assets includes a second number of media assets, and the first number is unequal to the second number.

A computing node, a used herein, may include a distributed computing system and does not necessarily mean all parts of the node are included in a single chassis such as a server rack or a PC.

Example 2b. The at least one medium of example 1b, wherein the operations comprise: in response to authenticating the first user, the first node receiving at least one first configuration file from the third computing node; in response to authenticating the second user, the second node receiving at least one second configuration file from the third computing.

Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. At least one non-transitory machine-readable medium having stored thereon data which, if used by a third node that includes at least one processor, causes the third node to perform operations comprising:
   in response to receiving a first identifier for a first node that includes at least one processor, authenticate a first user of the first node via a first authentication service;
   in response to receiving a second identifier for a second node that includes at least one processor, authenticate a second user of the second node via a second authentication service that is unequal to the first authentication service;
   in response to authenticating the first user of the first node, communicate a first list of media assets and at least one first configuration file to the first computing node; wherein (a) the at least one first configuration file includes an identifier corresponding to a group, and (b) the group includes the first identifier;
   in response to authenticating the second user of the second node, communicate a second list of media assets and at least one second configuration file to the second computing node but not the first computing node;
   in response to receiving a fourth identifier for a fourth node that includes at least one processor, determine the fourth identifier is included within the group;
   in response to determining the fourth identifier is included within the group, communicate another instance of the at least one first configuration file to the fourth computing node;
   wherein the first list of media assets includes a first number of media assets, the second list of media assets includes a second number of media assets, and the first number is unequal to the second number.

2. The at least one medium of claim 1:
   wherein receiving the first identifier for the first node includes receiving the first identifier for the first node at a first time;

wherein the operations further comprise in response to receiving the first identifier for the first node at a second time that follows the first time, authenticate the first user of the first node via at least one of the second authentication service or a third authentication service.

3. The at least one medium of claim 1, wherein the operations comprise:
in response to authenticating the first user, communicating a first media player to the first computing node;
in response to authenticating the second user, communicating a second media player to the second computing node but not the first computing node;
wherein the first media player corresponds to a first format of media and the second player corresponds to a second format of media;
wherein the first format of media is unequal to the second format of media;
wherein the first media player includes data which, if used by the first computing node, causes the first computing node to perform operations comprising displaying play and stop graphical user elements.

4. The at least one medium of claim 3, wherein the first media player includes an executable file.

5. The at least one medium of claim 1, wherein:
the at least one first configuration file directs the first user to a first analytics service;
the at least one second configuration file directs the second user to a second analytics service.

6. The at least one medium of claim 5, wherein the operations comprise:
in response to authenticating the first user, creating at least a portion of the first configuration file;
in response to authenticating the second user, creating at least a portion of the second configuration file.

7. The at least one medium of claim 6, wherein the first and second authentication services are hosted on different computing nodes from one another.

8. The at least one medium of claim 1:
wherein receiving the first identifier for the first node includes receiving the first identifier for the first node at a first time;
wherein the operations further comprise in response to receiving the first identifier for the first node at a second time that follows the first time, communicate a third list of media assets to the first computing node;
wherein the third list of media assets includes a third number of media assets, and the first number is unequal to the third number.

9. The at least one medium of claim 8, wherein the operations comprise:
determining a characteristic of the first node;
in response to determining the characteristic of the first node, communicating the at least one first configuration file to the first computing node.

10. The at least one medium of claim 9, wherein the characteristic of the first node corresponds to a characteristic of hardware included in the first node.

11. The at least one medium of claim 8, wherein the operations comprise:
determining a characteristic of the first node;
in response to determining the characteristic of the first node, creating a portion of the at least one first configuration file and then communicating the portion to the first node.

12. The at least one medium of claim 1, wherein the at least one first configuration file includes configuration information for the first authentication service but not the second authentication service.

13. The at least one medium of claim 5, wherein the at least one first configuration file includes configuration information for the first analytics service.

14. The at least one medium of claim 13, wherein the at least one first configuration file includes branding information corresponding to a single sign on (SSO) display.

15. The at least one medium of claim 14, wherein:
the at least one first configuration file includes configuration information for a media player;
the media player includes data which, if used by the first computing node, causes the first computing node to perform operations comprising displaying play and stop graphical user elements;
wherein the first computing node does not include a set-top box.

16. The at least one medium of claim 1, wherein the at least one first configuration file includes a Real Simple Syndication (RSS) document.

17. The at least one medium of claim 1:
wherein the operations comprise in response to authenticating the first user, communicating at least one third configuration file to the first computing node;
wherein the at least one first configuration file corresponds to a first media asset included in the first list;
wherein the at least one third configuration file corresponds to a third media asset included in the first list.

* * * * *